US011758557B2

(12) United States Patent
Khoshnevisan et al.

(10) Patent No.: US 11,758,557 B2
(45) Date of Patent: Sep. 12, 2023

(54) DISCONTINUOUS RECEPTION INACTIVITY TIMER FOR PDCCH REPETITION

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/410,890

(22) Filed: Aug. 24, 2021

(65) Prior Publication Data

US 2022/0070835 A1 Mar. 3, 2022

Related U.S. Application Data

(60) Provisional application No. 63/073,584, filed on Sep. 2, 2020.

(51) Int. Cl.
*H04W 72/10* (2009.01)
*H04W 76/28* (2018.01)
*H04L 5/00* (2006.01)
*H04W 72/23* (2023.01)

(52) U.S. Cl.
CPC .......... *H04W 72/23* (2023.01); *H04L 5/0048* (2013.01); *H04W 76/28* (2018.02)

(58) Field of Classification Search
CPC .... H04W 72/042; H04W 76/28; H04L 5/0048
See application file for complete search history.

(56) References Cited

U.S. PATENT DOCUMENTS

2017/0289899 A1 10/2017 You et al.
2021/0360667 A1* 11/2021 Moon ............... H04W 72/1273
2022/0330378 A1* 10/2022 Seo ....................... H04W 72/04

OTHER PUBLICATIONS

Huawei, et al., "Correction on the Conditions to Start or Restart drx-Inactivity Timer", 3GPP Draft, 3GPP TSG-WG2 Meeting #93bis, 36321_CRXXXX_(REL-13)_R2-162587, 3rd Generation Partnership Project (3GPP), Mobile Competence Centre, 650, Route Des, Dubrovnik, Croatia, Apr. 11, 2016-Apr. 15, 2016, Apr. 1, 2016 (Apr. 1, 2016), XP051081963, 5 pages, Retrieved from the Internet: URL: http://www.3gpp.org/ftp/tsg_ran/WG2_RL2/TSGR2_93bis/Docs/ [retrieved on Apr. 1, 2016], the whole document.

(Continued)

*Primary Examiner* — Ronald B Abelson
(74) *Attorney, Agent, or Firm* — Procopio, Cory, Hargreaves & Savitch LLP

(57) ABSTRACT

A configuration to allow a UE to determine if a detected PDCCH corresponds to a linked PDCCH candidate with repetition. The apparatus monitors for a PDCCH based on a DRX configuration, the DRX configuration having an inactivity timer. The apparatus determines whether the PDCCH corresponds to a linked PDCCH candidate and a new transmission is scheduled, wherein the linked PDCCH candidate is comprised of two or more PDCCH repetitions. The apparatus starts the inactivity timer in a first symbol after an end of at least one of the two or more PDCCH repetitions.

30 Claims, 13 Drawing Sheets

(56) References Cited

OTHER PUBLICATIONS

International Search Report and Written Opinion—PCT/US2021/047577—ISA/EPO—dated Dec. 3, 2021.
LG Electronics Inc: "DRX Related Timers Handling", 3GPP Draft, 3GPP TSG-RAN WG2 Meeting #92, R2-156766 DRX Related Timers Handling, 3rd Generation Partnership Project (3GPP), Mobile Competence Centre, 650, Route Des Lucioles, F-06921, Sophia-Antipolis Cedex, France, vol. RAN WG2, No. Anehaim, USA; Nov. 16, 2015-Nov. 20, 2015, Nov. 16, 2015 (Nov. 16, 2015), XP051040419, 3 pages, Retrieved from the Internet: URL : http://www.3gpp.org/ftp/Meetings_3GPP_SYNC/RAN2/Docs/ [retrieved on Nov. 16, 2015], the whole document.
Samsung: "DRX Enhancements for Rel-13 Low Complexity MTC," 3GPP Draft, 3GPP TSG RAN WG2 #89bis, R2-151674, 3rd Generation Partnership Project (3GPP), Mobile Competence Centre, 650, Route Des Lucioles, F-06921, Sophia-Antipolis Cedex, France, vol. RAN WG2, No. Bratislava, Slovakia, Apr. 20, 2015-Apr. 24, 2015, Apr. 20, 2015 (Apr. 20, 2015), XP050936595, 4 pages, Retrieved from the Internet: URL: http://www.3gpp.org/ftp/Meetings_3GPP_SYNC/RAN2/Docs/ [retrieved on Apr. 20, 2015], the whole document.

\* cited by examiner

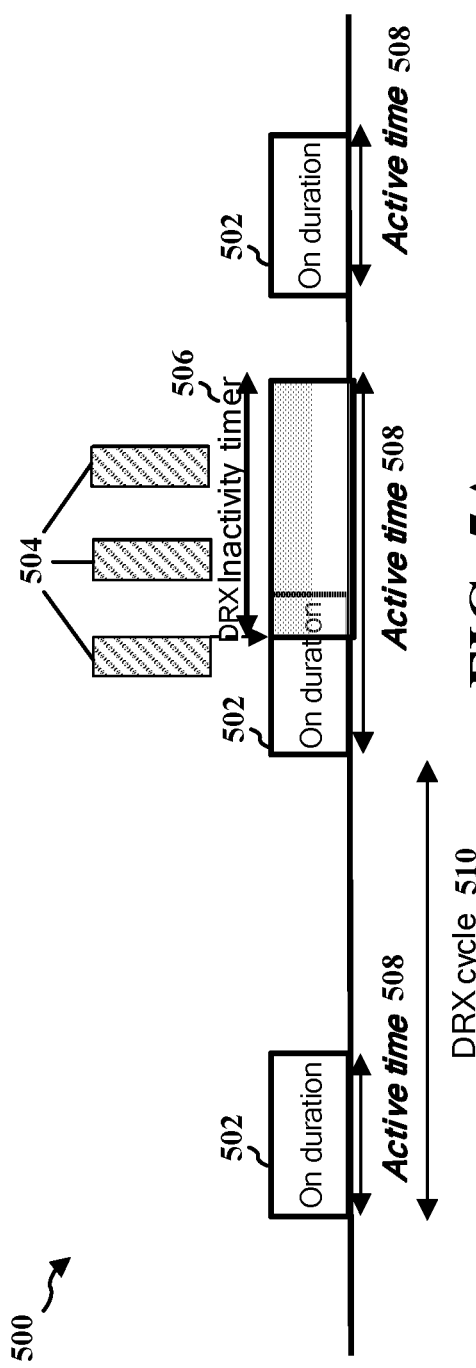
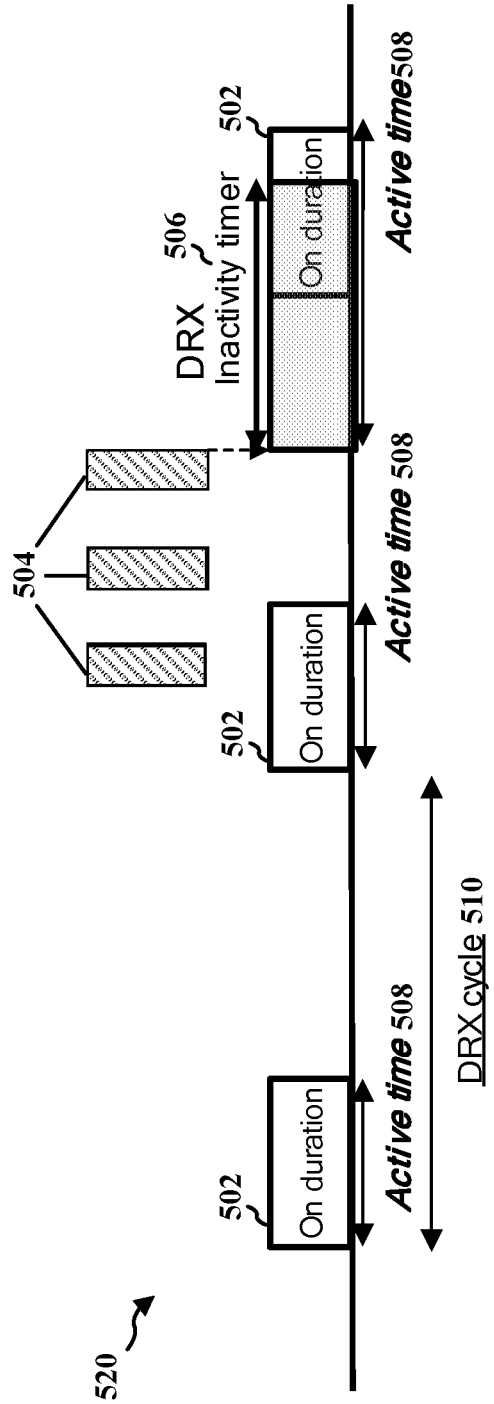
FIG. 5A
FIG. 5B

DISCONTINUOUS RECEPTION INACTIVITY TIMER FOR PDCCH REPETITION

CROSS REFERENCE TO RELATED APPLICATION(S)

This application claims the benefit of and priority to U.S. Provisional Application Ser. No. 63/073,584, entitled "Discontinuous Reception Inactivity Timer for PDCCH Repetition" and filed on Sep. 2, 2020, which is expressly incorporated by reference herein in its entirety.

TECHNICAL FIELD

The present disclosure relates generally to communication systems, and more particularly, to a configuration for a discontinuous reception (DRX) inactivity timer for physical downlink control channel (PDCCH) repetition.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus monitors for a physical downlink control channel (PDCCH) based on a discontinuous reception (DRX) configuration, the DRX configuration having an inactivity timer. The apparatus determines whether the PDCCH corresponds to a linked PDCCH candidate and a new transmission is scheduled, wherein the linked PDCCH candidate is comprised of two or more PDCCH repetitions. The apparatus starts the inactivity timer in a first symbol after an end of at least one of the two or more PDCCH repetitions.

In an aspect of the disclosure, a method, a computer-readable medium, and an apparatus are provided. The apparatus may be a device at a base station. The device may be a processor and/or a modem at a base station or the base station itself. The apparatus configures a discontinuous reception (DRX) configuration having an inactivity timer. The apparatus transmits, to a user equipment (UE), a physical downlink control channel (PDCCH) based on the DRX configuration, wherein the PDCCH corresponds to a linked PDCCH candidate and a new transmission is scheduled, wherein the linked PDCCH candidate is comprised of two or more PDCCH repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5B illustrate examples of a DRX configuration with PDCCH repetition.

DETAILED DESCRIPTION

Figure 1:
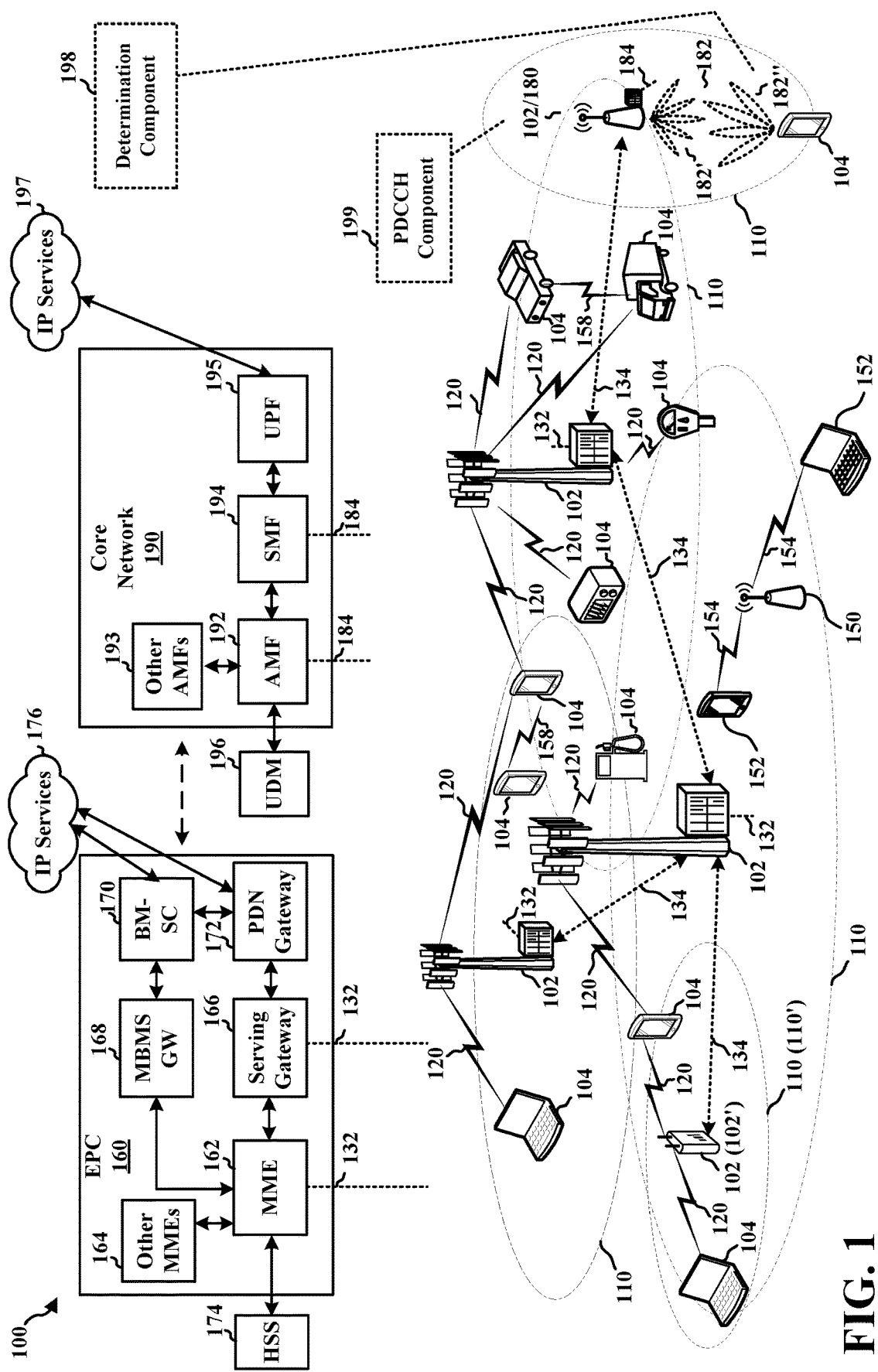
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to determine whether a PDCCH corresponds to a linked PDCCH candidate. For example, the UE 104 may comprise a determination component 198 configured to determine whether the PDCCH corresponds to the linked PDCCH candidate and that a new transmission is scheduled. The UE 104 may monitor for a PDCCH based on a DRX configuration, the DRX configuration having an inactivity timer. The UE 104 may determine whether the PDCCH corresponds to a linked PDCCH candidate and a new transmission is scheduled, wherein the linked PDCCH candidate is comprised of two or more PDCCH repetitions. The UE 104 may start the inactivity timer in a first symbol after an end of at least one of the two or more PDCCH repetitions.

Referring again to FIG. 1, in certain aspects, the base station 180 may be configured to transmit a PDCCH that may correspond to a linked PDCCH candidate. For example, the base station 180 may comprise a PDCCH component 199 configured to transmit the PDCCH that may correspond to the linked PDCCH candidate. The base station 180 may configure a DRX configuration having an inactivity timer. The base station 180 may transmit, to a UE, a PDCCH based on the DRX configuration, wherein the PDCCH corresponds to a linked PDCCH candidate and a new transmission is scheduled, wherein the linked PDCCH candidate is comprised of two or more PDCCH repetitions.

Although the following description may be focused on 5G NR, the concepts described herein may be applicable to other similar areas, such as LTE, LTE-A, CDMA, GSM, and other wireless technologies.

Figure 2:
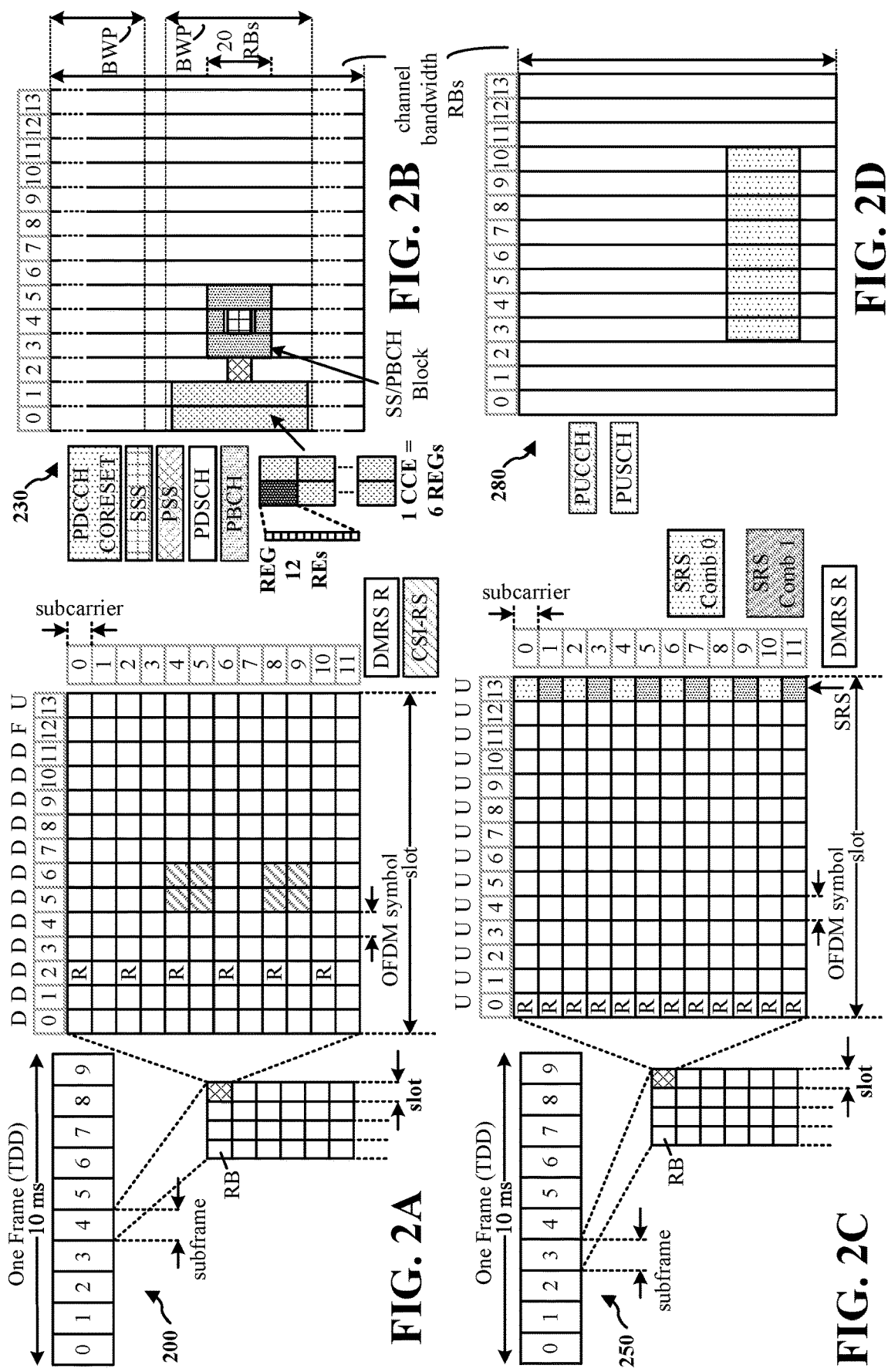
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
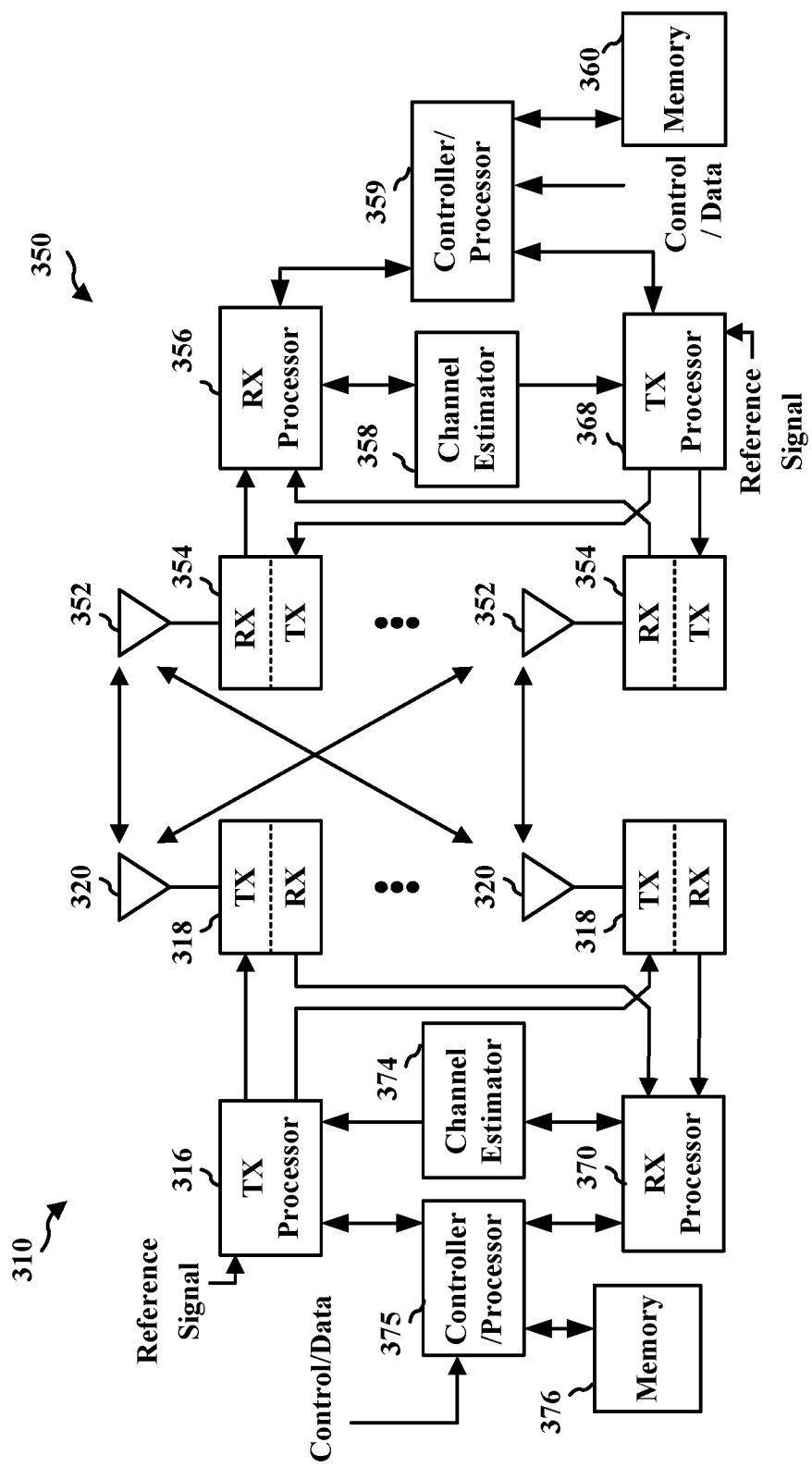
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communication systems, a UE may be configured with DRX, such that the UE may determine an active time based on one or more timers. The UE may monitor for PDCCH within the active time, but does not monitor for PDCCH outside of the active time. The one or more timers may include drx-onDurationTimer which may correspond to the duration at the beginning of a DRX cycle; drx-InactivityTimer which may correspond to the duration after the PDCCH occasion in which a PDCC initiates a new uplink or downlink transmission for a MAC entity; drx-RetransmissionTimerDL (per downlink HARQ process) which may correspond to the maximum duration until a downlink retransmission is received; drx-RetransmissionTimerUL (per uplink HARQ process) which may correspond to the maximum duration until a grant for uplink retransmission is received. The active time may include the time while drx-onDurationTimer, drx-InactivityTimer, drx-RetransmissionTimerDL, or drx-RetransmissionTimerUL is running (or in the presence of other conditions, such as but not limited to RACH or SR procedures).

Figure 4:
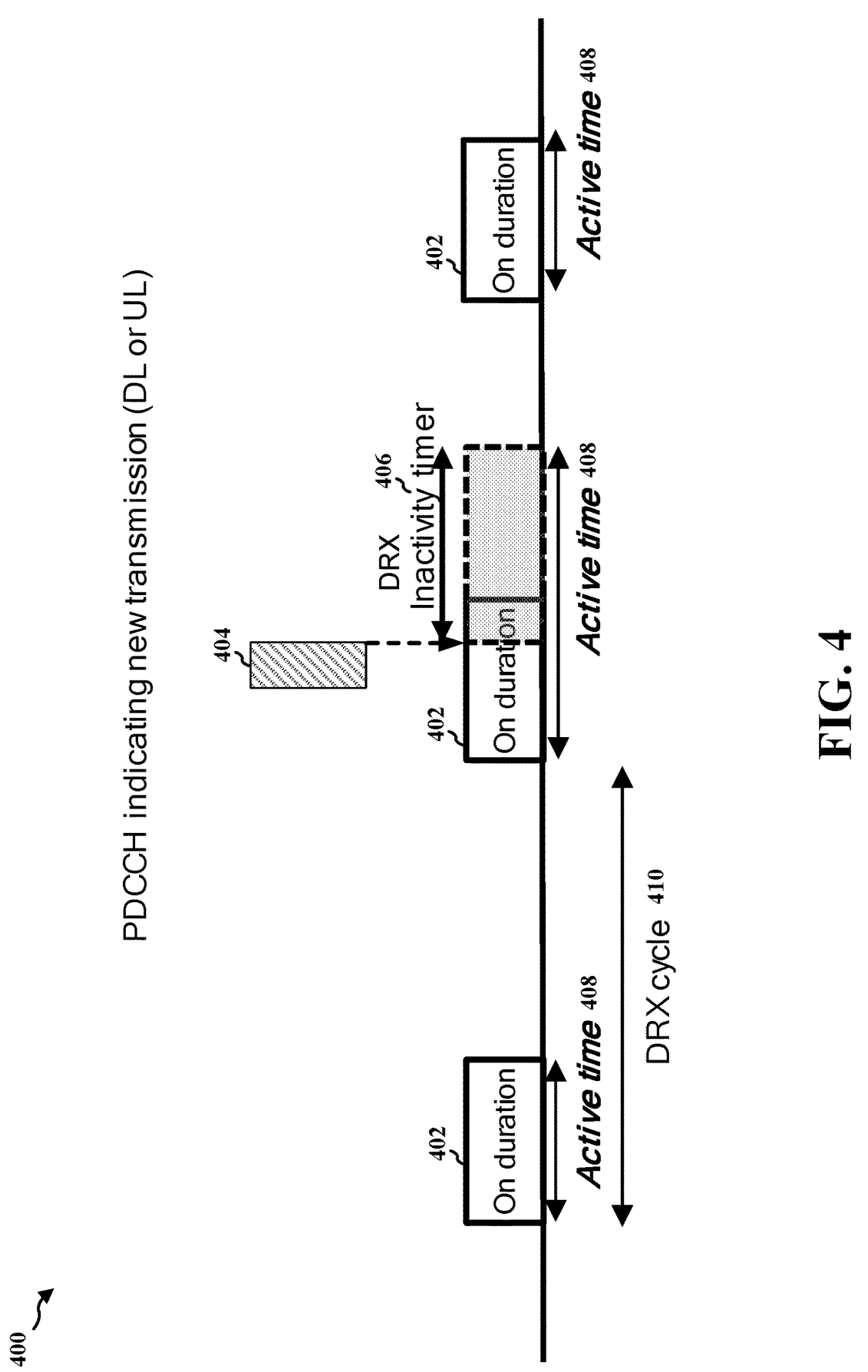
FIG. 4 illustrates an example of a DRX configuration.

FIG. 4 illustrates an example 400 of a DRX configuration. A UE may be configured with a DRX functionality. During an RRC connected state, when there is no data transmission in either direction (e.g., uplink or downlink), the UE may go into a DRX mode in which the UE starts monitoring the PDCCH channel discontinuously, using a sleep and wake cycle. The DRX configuration may be configured by the network in RRC signaling from a base station. A DRX configuration may include the configuration of any of a number of timers and values, such as any of an On duration 402, a DRX inactivity timer 406, an active time 408, a DRX cycle 410. The DRX cycle 410 may comprise a periodic repetition of On duration 402 in which the UE monitors PDCCH 404, and an Off duration which the UE does not monitor for PDCCH. The DRX Inactivity Timer gives a time, e.g., in terms of transmission time interval (TTI) duration, after the UE successfully decodes PDCCH before the UE may again enter the OFF Duration. The On Duration Timer may give the number of consecutive PDCCH subframe(s) that need to be monitored/decoded when the UE wakes up from the OFF duration in DRX Cycle.

If a PDCCH 404 indicates a new transmission (e.g., downlink or uplink), the UE may start or restart the inactivity timer 406 (e.g., drx-InactivityTimer) in a first symbol after the end of the PDCCH reception. As shown in the example 400 of FIG. 4, starting or restarting the inactivity timer 406 may extend the active time 408.

In some instances, PDCCH repetition may occur, where each repetition may be a PDCCH candidate. Two or more PDCCH candidates may be linked together for possible repetition of a same DCI. In some instances, a third PDCCH candidate may be defined by linking the two or more PDCCH candidate to form a linked PDCCH candidate. Different PDCCH repetitions may be transmitted with different transmission configuration indicator (TCI) states, which may allow for an increased diversity or reliability. The UE may blindly decode each of the PDCCH candidates. Two blind decodings may correspond to the first and second PDCCH candidates, while another blind decoding may correspond to the linked PDCCH candidate with repetition.

In some instances, if a PDCCH indicates a new transmission for a PDSCH or PUSCH, the start of the inactivity timer may not be properly defined. The UE should reliably determine if the detected PDCCH corresponds to a linked candidate with repetition. If the UE determines that the detected PDCCH corresponds to a linked candidate, then the UE should be able to determine when to start the inactivity timer. In some instances, some PDCCH repetitions of the linked PDCCH candidate may be within the active time while other PDCCH repetitions may be outside of the active time, and the UE should be configured to determine the monitoring of the linked PDCCH candidate in such instances.

Aspects presented herein provide a configuration to allow a UE to determine whether a detected PDCCH corresponds to a linked PDCCH candidate with repetition, such that the UE is configured to start the inactivity timer after one of the PDCCH repetitions. The configuration may also configure a UE to determine the manner of monitoring of the linked PDCCH candidate.

FIGS. 5A-5B illustrate examples 500, 520 of a DRX configuration with PDCCH repetition. In the example 500 of FIG. 5A, the DRX configuration may configure the on duration 502, DRX inactivity timer 506, active time 508, and DRX cycle 510. The UE may be configured to determine whether the detected PDCCH 504 corresponds to a linked PDCCH candidate. The linked PDCCH candidate may be comprised of two or more PDCCH repetitions. In some instances, the detected PDCCH 504 may schedule a new transmission (e.g., PDSCH for downlink or PUSCH for uplink). A new data indicator (NDI) may be toggled for an indicated HARQ process identifier corresponding to the scheduled PDSCH or PUSCH. The UE may be configured to start or restart the DRX inactivity timer 506 (e.g., drx-InactivityTimer) in a first symbol of one of the PDCCH repetitions. In the example 500 of FIG. 5A, the UE may start or restart the DRX inactivity timer 506 in the first symbol after the end of the first PDCCH repetition of the linked PDCCH candidate. In the example 520 of FIG. 5B, the UE may start or restart the DRX inactivity timer 506 in the first symbol after the end of the last PDCCH repetition of the linked PDCCH candidate.

To determine whether the detected PDCCH corresponds to a linked PDCCH candidate, the UE may utilize blind decoding to detect/decode PDCCH. For example, the UE may decode a linked candidate while the base station may have actually transmitted PDCCH in an individual candidate corresponding to only one of the repetitions or vice versa. In some aspects, the two or more linked PDCCH candidates may always come together, if the UE detects DCI in one repetition only. The UE may assume that the linked PDCCH candidate is detected. In some aspects, a bit in the DCI itself may indicate whether the detected DCI corresponds to a linked PDCCH candidate or not. In some aspects, a different radio network temporary identifier (RNTI), compared to an RNTI used for individual PDCCH candidates, may be used for cyclic redundancy check (CRC) scrambling of the DCI when it corresponds to a linked PDCCH candidate. In some aspects, a different DMRS scrambling identifier (e.g., pdcch-DMRS-ScramblingID), compared to a DMRS scrambling identifier used for individual PDCCH candidate, may be used for PDCCH scrambling (e.g., scrambling of coded bits of DCI) and/or for DMRS scrambling when PDCCH corresponds to a linked PDCCH candidate.

Figure 6:
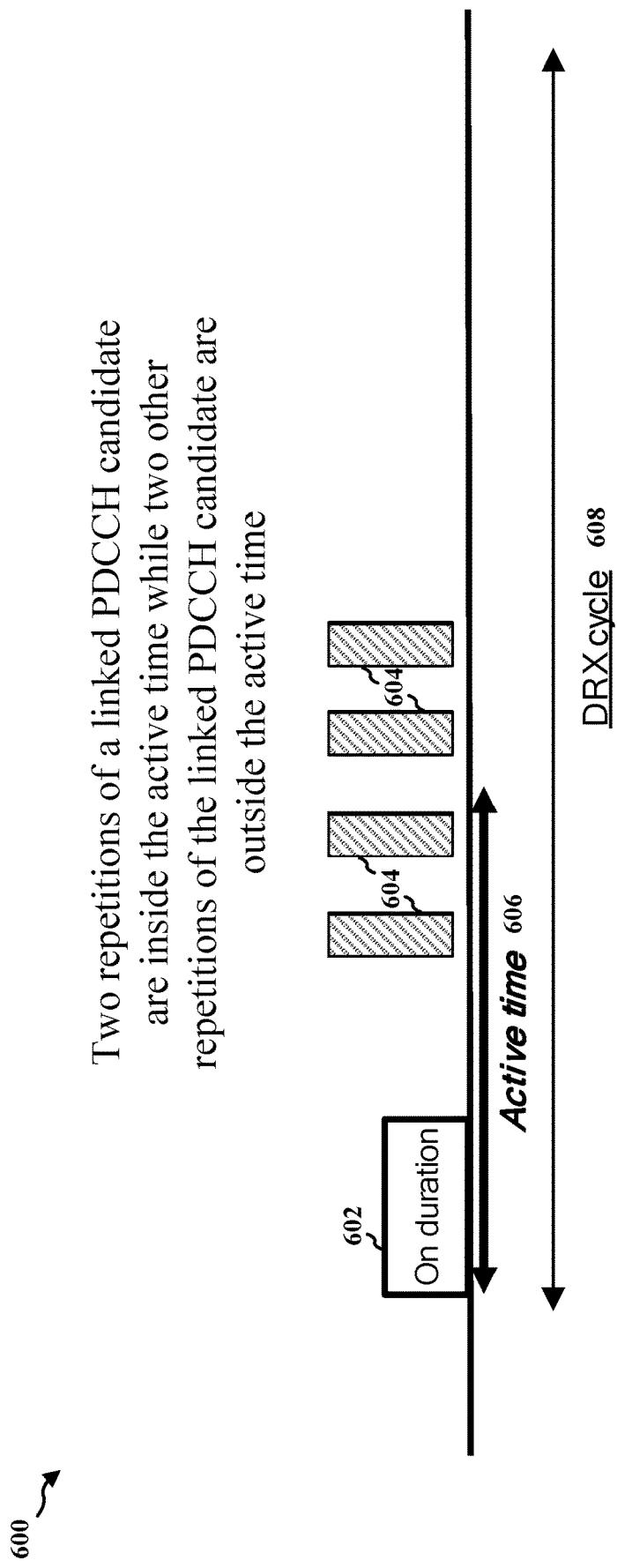
FIG. 6 illustrates an example of a DRX configuration with PDCCH repetition.

FIG. 6 illustrates an example 600 of a DRX configuration with PDCCH repetition. The DRX configuration may configure an On duration 602, an active time 606, and a DRX cycle 608. In some aspects, for a linked PDCCH candidate that may be comprised of multiple repetitions, if one or more repetitions are within the active time 606 while one or more of the other repetitions are outside of the active time 606, the UE may monitor the linked PDCCH candidate including all of the repetitions. In some aspects, the UE may only monitor for the repetitions of the linked PDCCH candidate that are inside the active time. In some aspects, the UE does not monitor the linked PDCCH candidate in any of the repetitions, if one or more repetitions are within the active time and one or more other repetitions are outside of the active time.

Figure 7:
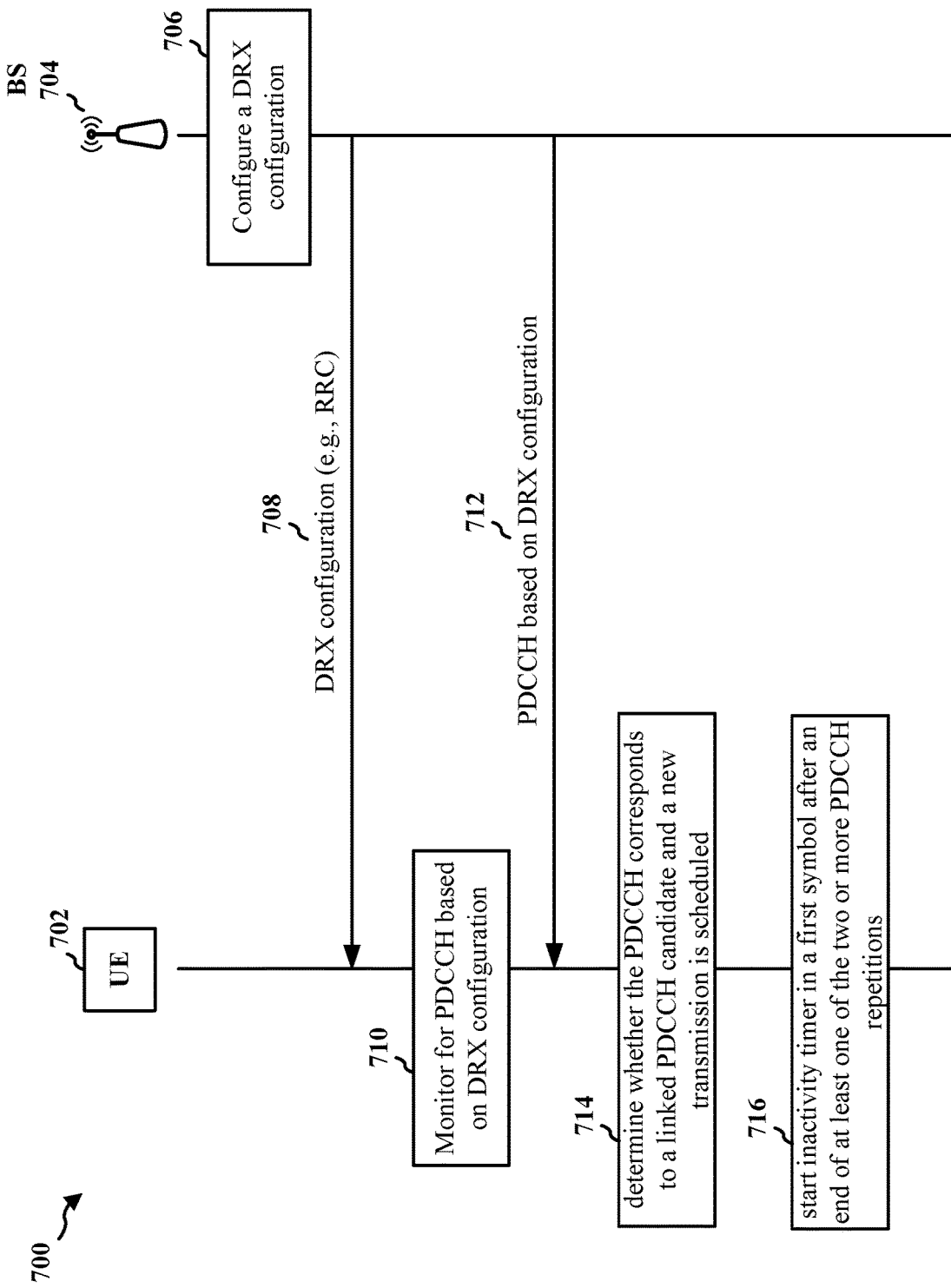
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350.

As illustrated at 706, the base station 704 may configure a DRX configuration. The DRX configuration may comprise an inactivity timer. The base station 704 may configure the DRX configuration for a UE 702.

As illustrated at 708, the base station 704 may transmit the DRX configuration. The base station 704 may transmit the DRX configuration to the UE 702. The UE 702 may receive the DRX configuration from the base station 704. The base station may transmit the DRX configuration to the UE 702 via RRC signaling.

As illustrated at 710, the UE 702 may monitor for a PDCCH from the base station 704. The UE 702 may monitor for the PDCCH from the base station 704 based on the DRX configuration. The DRX configuration may comprise an inactivity timer.

As illustrated at 712, the base station 704 may transmit a PDCCH based on the DRX configuration. The base station 704 may transmit the PDCCH based on the DRX configuration to the UE 702. The UE 702 may receive the PDCCH from the base station 704. The base station 704 may transmit a linked PDCCH candidate. The linked PDCCH candidate may be comprised of two or more PDCCH repetitions.

As illustrated at 714, the UE 702 may determine whether the PDCCH corresponds to a linked PDCCH candidate and a new transmission is scheduled. The linked PDCCH candidate may be comprised of two or more PDCCH repetitions. In some aspects, the UE 702 may determine that the PDCCH corresponds to the linked PDCCH candidate based on at least one of two or more linked PDCCH candidates may always be received together, a bit in downlink control information (DCI) may indicate that the DCI corresponds to the linked PDCCH candidate, a different RNTI may be used for scrambling of the DCI when the DCI corresponds to the linked PDCCH candidate, or a different scrambling identifier may be used for PDCCH scrambling or for demodulated reference signal (DMRS) scrambling. In some aspects, at least a first repetition may be within an active time and at least a second repetition may be outside of the active time. In some aspects, all the repetitions of the linked PDCCH candidate may be monitored. In some aspects, only the repetitions within the active time may be monitored. In some aspects, none of the repetitions of the linked PDCCH candidate may be monitored.

As illustrated at 716, the UE may start the inactivity timer in a first symbol after an end of at least one of the two or more PDCCH repetitions. In some aspects, the inactivity timer may be started in the first symbol after the end of a first PDCCH repetition. In some aspects, the inactivity timer may be started in the first symbol after the end of a last PDCCH repetition.

Figure 8:
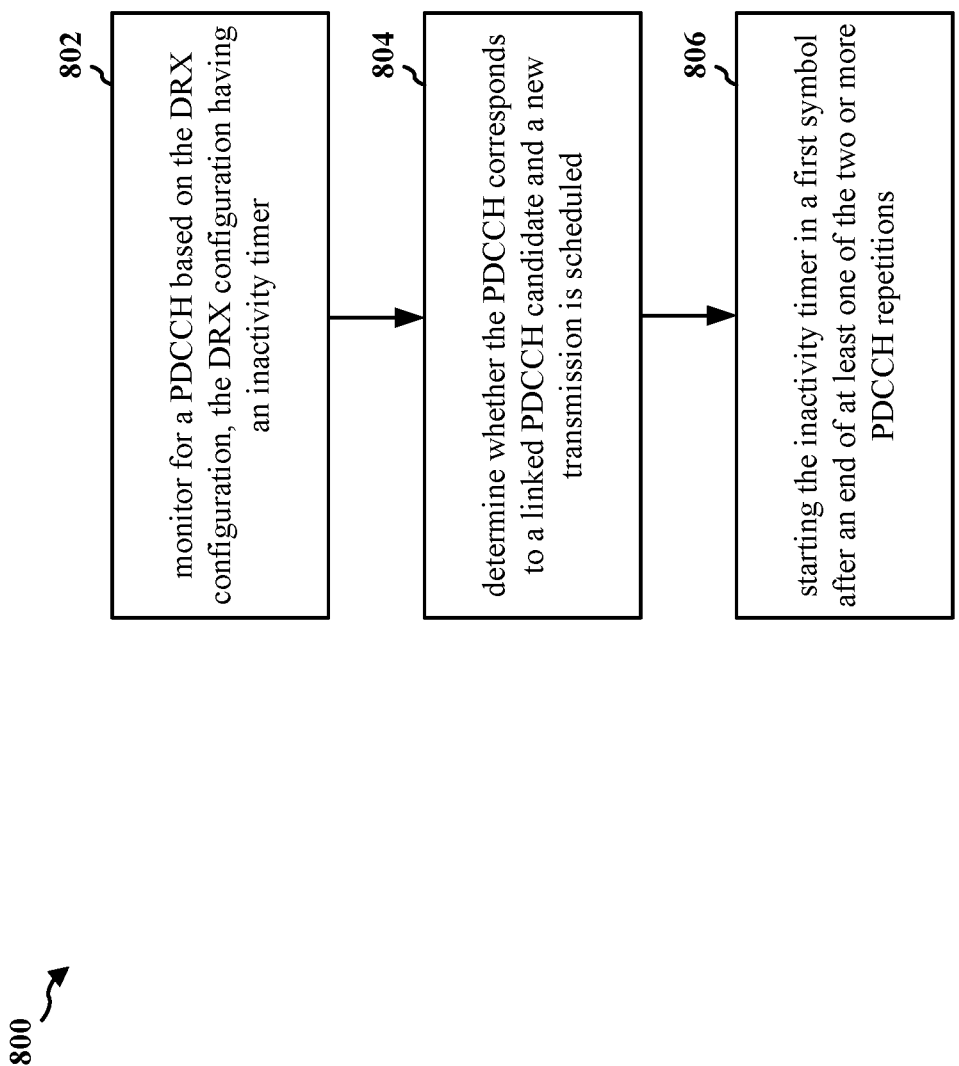
FIG. 8 is a flowchart of a method of wireless communication.

FIG. 8 is a flowchart 800 of a method of wireless communication. The method may be performed by a UE or a component of a UE (e.g., the UE 104; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to determine if a detected PDCCH corresponds to a linked PDCCH candidate with repetition, such that the UE starts an inactivity timer after one of the PDCCH repetitions.

At 802, the UE may monitor for a PDCCH. For example, 802 may be performed by monitor component 1042 of apparatus 1002. The UE may monitor for a PDCCH based on a DRX configuration. The DRX configuration may comprise an inactivity timer.

At 804, the UE may determine whether the PDCCH corresponds to a linked PDCCH candidate and a new transmission is scheduled. For example, 804 may be performed by determination component 1044 of apparatus 1002. The linked PDCCH candidate may be comprised of two or more PDCCH repetitions. In some aspects, the UE may determine that the PDCCH corresponds to the linked PDCCH candidate based on at least one of two or more linked PDCCH candidates may always be received together, a bit in downlink control information (DCI) may indicate that the DCI corresponds to the linked PDCCH candidate, a different radio network temporary identifier (RNTI) may be used for scrambling of the DCI when the DCI corresponds to the linked PDCCH candidate, or a different scrambling identifier may be used for PDCCH scrambling or for demodulated reference signal (DMRS) scrambling. In some aspects, at least a first repetition may be within an active time and at least a second repetition may be outside of the active time. In some aspects, all the repetitions of the linked PDCCH candidate may be monitored. In some aspects, only the repetitions within the active time may be monitored. In some aspects, none of the repetitions of the linked PDCCH candidate may be monitored.

At 806, the UE may start the inactivity timer in a first symbol after an end of at least one of the two or more PDCCH repetitions. For example, 806 may be performed by timer component 1046 of apparatus 1002. In some aspects, the inactivity timer may be started in the first symbol after the end of a first PDCCH repetition. In some aspects, the inactivity timer may be started in the first symbol after the end of a last PDCCH repetition.

Figure 9:
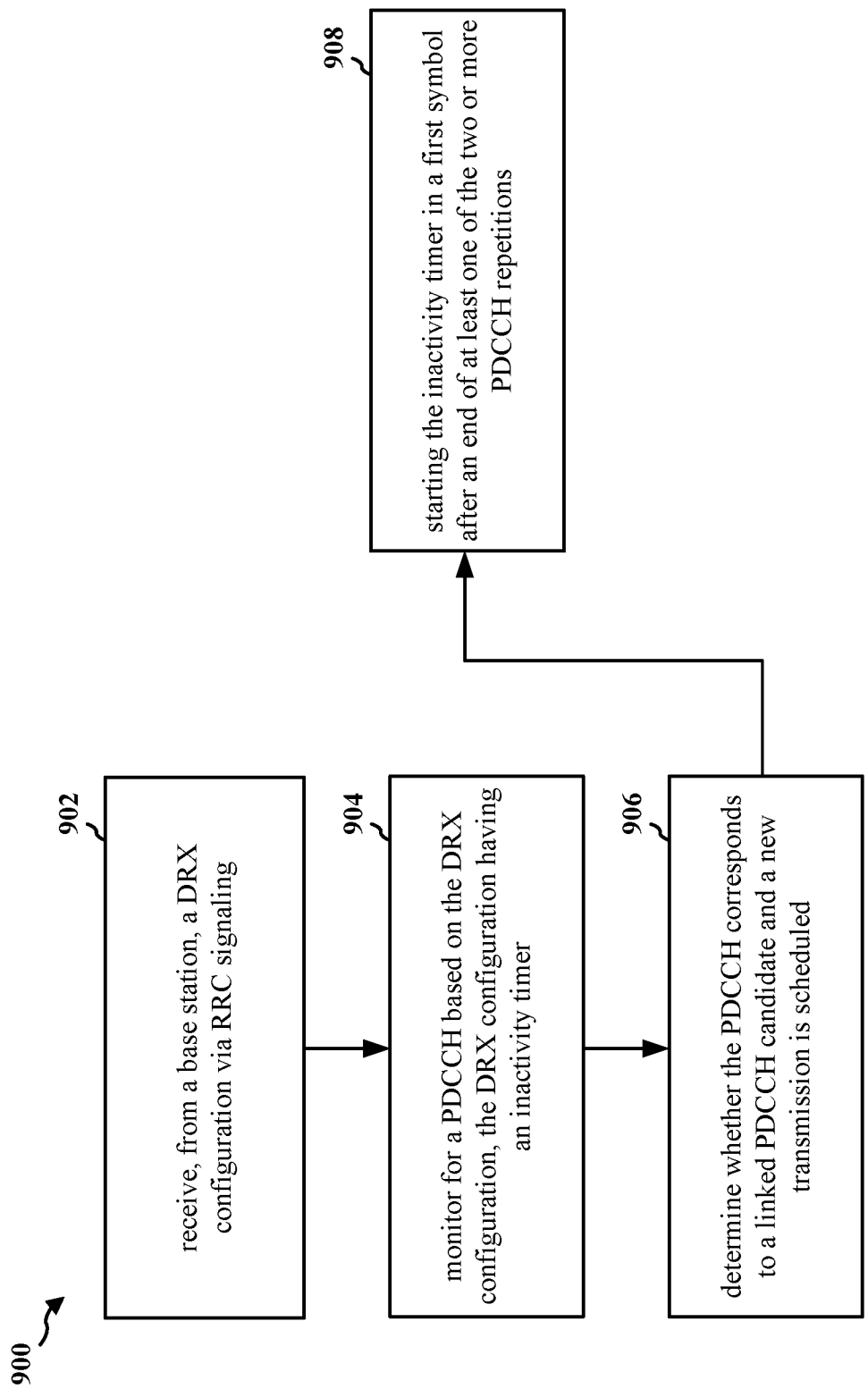
FIG. 9 is a flowchart of a method of wireless communication.

FIG. 9 is a flowchart 900 of a method of wireless communication. The method may be performed by a UE or a component of a UE (e.g., the UE 104; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to determine if a detected PDCCH corresponds to a linked PDCCH candidate with repetition, such that the UE starts an inactivity timer after one of the PDCCH repetitions.

At 902, the UE may receive a DRX configuration. For example, 902 may be performed by DRX component 1040 of apparatus 1002. The UE may receive the DRX configuration from a base station. The UE may receive the DRX configuration from the base station via RRC signaling.

At 904, the UE may monitor for a PDCCH. For example, 904 may be performed by monitor component 1042 of apparatus 1002. The UE may monitor for a PDCCH based on a DRX configuration. The DRX configuration may comprise an inactivity timer.

At 906, the UE may determine whether the PDCCH corresponds to a linked PDCCH candidate and a new transmission is scheduled. For example, 906 may be performed by determination component 1044 of apparatus 1002. The linked PDCCH candidate may be comprised of two or more PDCCH repetitions. In some aspects, the UE may determine that the PDCCH corresponds to the linked PDCCH candidate based on at least one of two or more linked PDCCH candidates may always be received together, a bit in downlink control information (DCI) may indicate that the DCI corresponds to the linked PDCCH candidate, a different radio network temporary identifier (RNTI) may be used for scrambling of the DCI when the DCI corresponds to the linked PDCCH candidate, or a different scrambling identifier may be used for PDCCH scrambling or for demodulated reference signal (DMRS) scrambling. In some aspects, at least a first repetition may be within an active time and at least a second repetition may be outside of the active time. In some aspects, all the repetitions of the linked PDCCH candidate may be monitored. In some aspects, only the repetitions within the active time may be monitored. In some aspects, none of the repetitions of the linked PDCCH candidate may be monitored.

At 908, the UE may start the inactivity timer in a first symbol after an end of at least one of the two or more PDCCH repetitions. For example, 908 may be performed by timer component 1046 of apparatus 1002. In some aspects, the inactivity timer may be started in the first symbol after the end of a first PDCCH repetition. In some aspects, the inactivity timer may be started in the first symbol after the end of a last PDCCH repetition.

Figure 10:
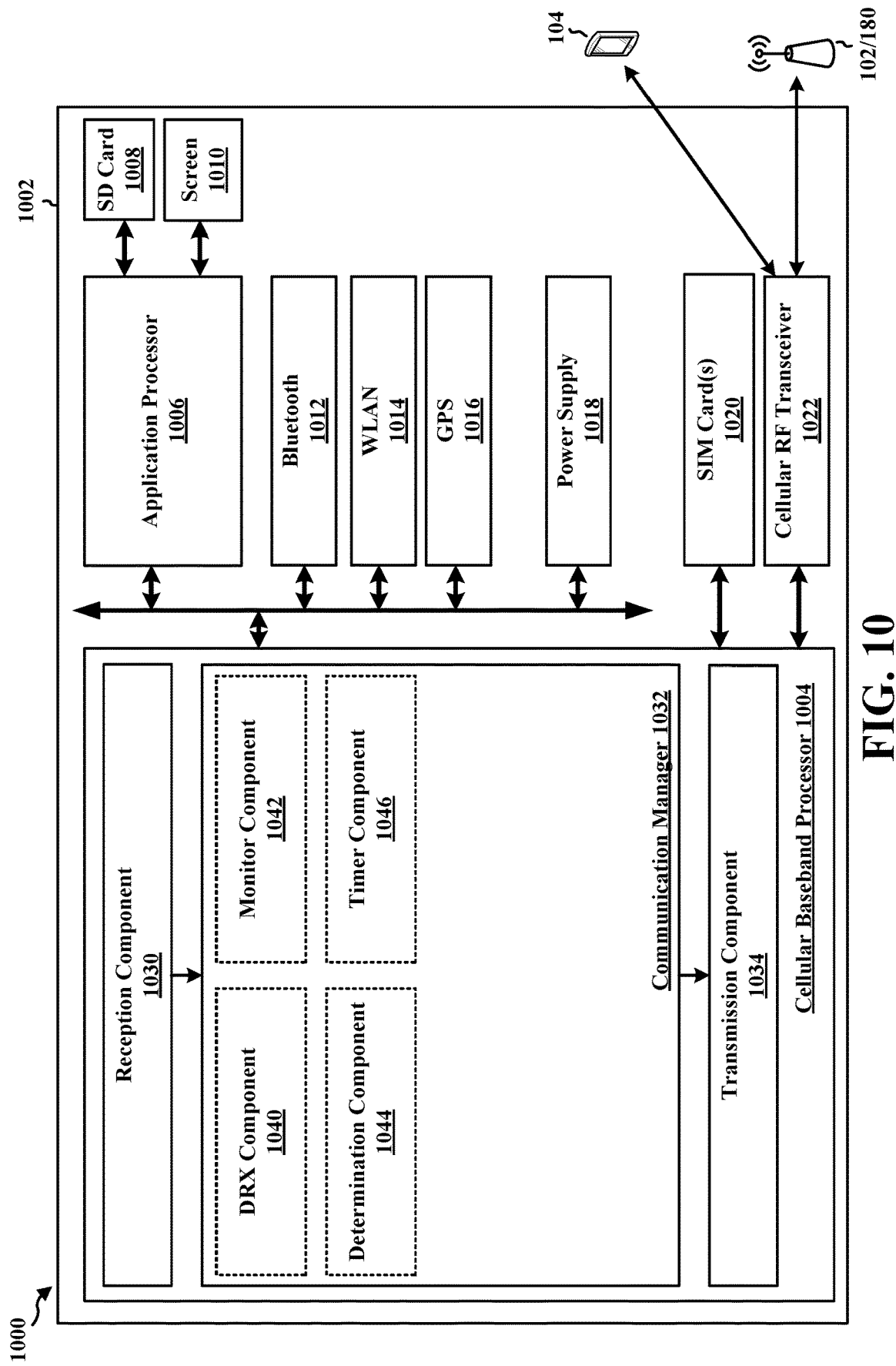
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a DRX component 1040 that is configured to receive a DRX configuration, e.g., as described in connection with 902 of FIG. 9. The communication manager 1032 further includes a monitor component 1042 that is configured to monitor for a PDCCH, e.g., as described in connection with 802 of FIG. 8 or 904 of FIG. 9. The communication manager 1032 further includes a determination component 1044 that is configured to determine whether the PDCCH corresponds to a linked PDCCH candidate and a new transmission is scheduled, e.g., as described in connection with 804 of FIG. 8 or 906 of FIG. 9. The communication manager 1032 further includes a timer component 1046 that is configured to start the inactivity timer in a first symbol after an end of at least one of the two or more PDCCH repetitions, e.g., as described in connection with 806 of FIG. 8 or 908 of FIG. 9.

The apparatus may include additional components that perform each of the blocks of the algorithm in the flowcharts of FIG. 8 or 9. As such, each block in the flowcharts of FIG. 8 or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for monitoring for a PDCCH based on a DRX configuration, the DRX configuration having an inactivity timer. The apparatus includes means for determining whether the PDCCH corresponds to a linked PDCCH candidate and a new transmission is scheduled. The linked PDCCH candidate is comprised of two or more PDCCH repetitions. The apparatus includes means for starting the inactivity timer in a first symbol after an end of at least one of the two or more PDCCH repetitions. The apparatus further includes means for receiving, from a base station, the DRX configuration via RRC signaling. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
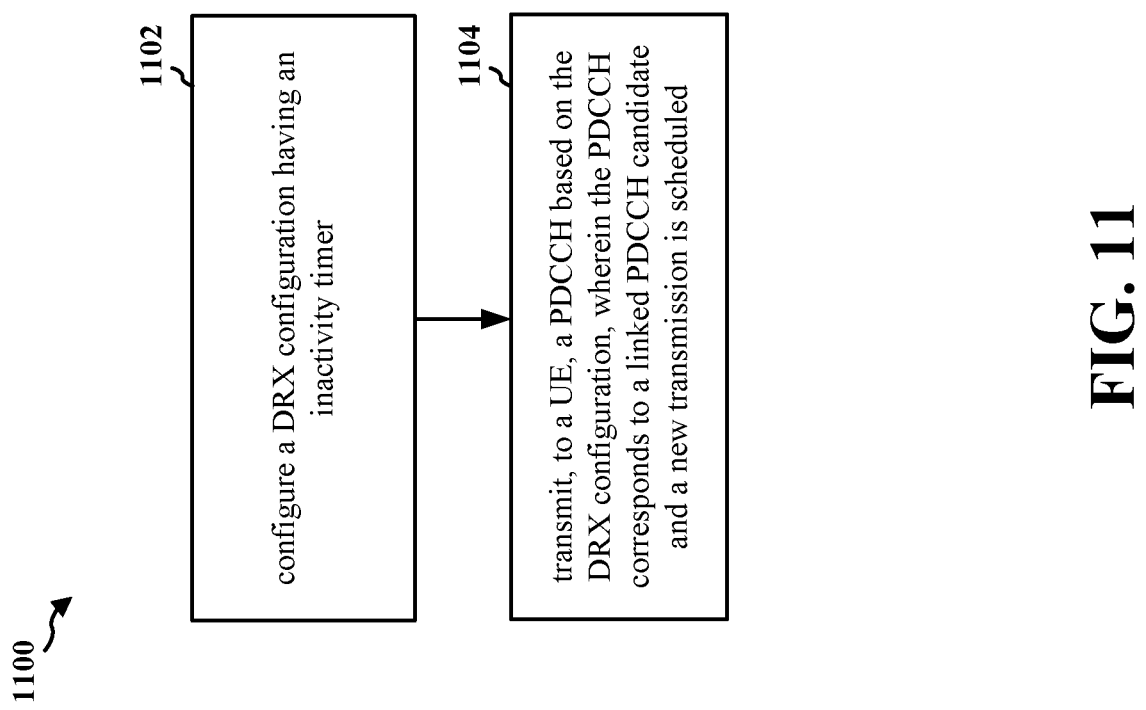
FIG. 11 is a flowchart of a method of wireless communication.

FIG. 11 is a flowchart 1100 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to determine if a detected PDCCH corresponds to a linked PDCCH candidate with repetition, such that the UE starts an inactivity timer after one of the PDCCH repetitions.

At 1102, the base station may configure a DRX configuration. For example, 1102 may be performed by configuration component 1340 of apparatus 1302. The DRX configuration may comprise an inactivity timer. The base station may configure the DRX configuration for at least one UE.

At 1104, the base station may transmit a PDCCH based on the DRX configuration. For example, 1104 may be performed by PDCCH component 1344 of apparatus 1302. The base station may transmit the PDCCH based on the DRX configuration to the UE. The PDCCH may correspond to a linked PDCCH candidate and may schedule a new transmission. The linked PDCCH candidate may be comprised of two or more PDCCH repetitions. In some aspects, the inactivity timer may be started in a first symbol after an end of a first PDCCH repetition. In some aspects, the inactivity timer may be started in a first symbol after an end of a last PDCCH repetition. The PDCCH may correspond to the linked PDCCH candidate based on at least one of two or more linked PDCCH candidates may always be received together, a bit in DCI may indicate that the DCI corresponds to the linked PDCCH candidate, a different RNTI may be used for scrambling of the DCI when the DCI corresponds to the linked PDCCH candidate, or a different scrambling identifier may be used for PDCCH scrambling or for DMRS scrambling. In some aspects, at least a first repetition may be within an active time and at least a second repetition may be outside of the active time. In some aspects, all the repetitions of the linked PDCCH candidate may be monitored. In some aspects, only the repetitions within the active time may be monitored. In some aspects, none of the repetitions of the linked PDCCH candidate may be monitored.

Figure 12:
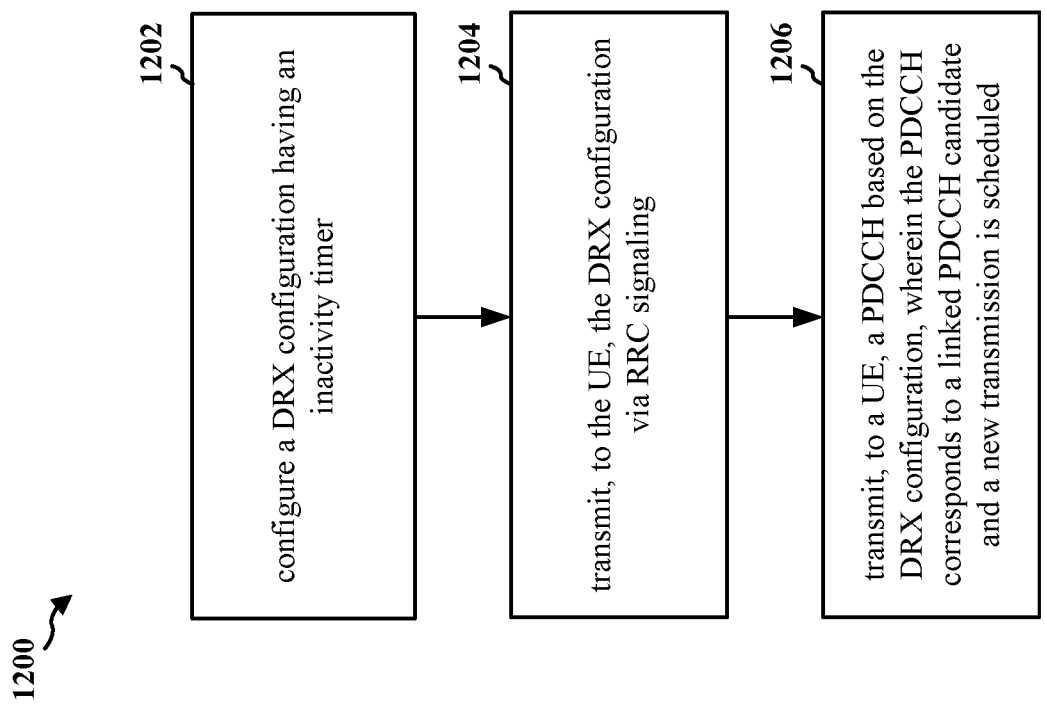
FIG. 12 is a flowchart of a method of wireless communication.

FIG. 12 is a flowchart 1200 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to determine if a detected PDCCH corresponds to a linked PDCCH candidate with repetition, such that the UE starts an inactivity timer after one of the PDCCH repetitions.

At 1202, the base station may configure a DRX configuration. For example, 1202 may be performed by configuration component 1340 of apparatus 1302. The DRX configuration may comprise an inactivity timer. The base station may configure the DRX configuration for at least one UE.

At 1204, the base station may transmit the DRX configuration. For example, 1204 may be performed by DRX component 1342 of apparatus 1302. The base station may transmit the DRX configuration to at least one UE. The base station may transmit the DRX configuration to the UE via RRC signaling.

At 1206, the base station may transmit a PDCCH based on the DRX configuration. For example, 1206 may be performed by PDCCH component 1344 of apparatus 1302. The base station may transmit the PDCCH based on the DRX configuration to the UE. The PDCCH may correspond to a linked PDCCH candidate and may schedule a new transmission. The linked PDCCH candidate may be comprised of two or more PDCCH repetitions. In some aspects, the inactivity timer may be started in a first symbol after an end of a first PDCCH repetition. In some aspects, the inactivity timer may be started in a first symbol after an end of a last PDCCH repetition. The PDCCH may correspond to the linked PDCCH candidate based on at least one of two or more linked PDCCH candidates may always be received together, a bit in DCI may indicate that the DCI corresponds to the linked PDCCH candidate, a different RNTI may be used for scrambling of the DCI when the DCI corresponds to the linked PDCCH candidate, or a different scrambling identifier may be used for PDCCH scrambling or for DMRS scrambling. In some aspects, at least a first repetition may be within an active time and at least a second repetition may be outside of the active time. In some aspects, all the repetitions of the linked PDCCH candidate may be monitored. In some aspects, only the repetitions within the active time may be monitored. In some aspects, none of the repetitions of the linked PDCCH candidate may be monitored.

Figure 13:
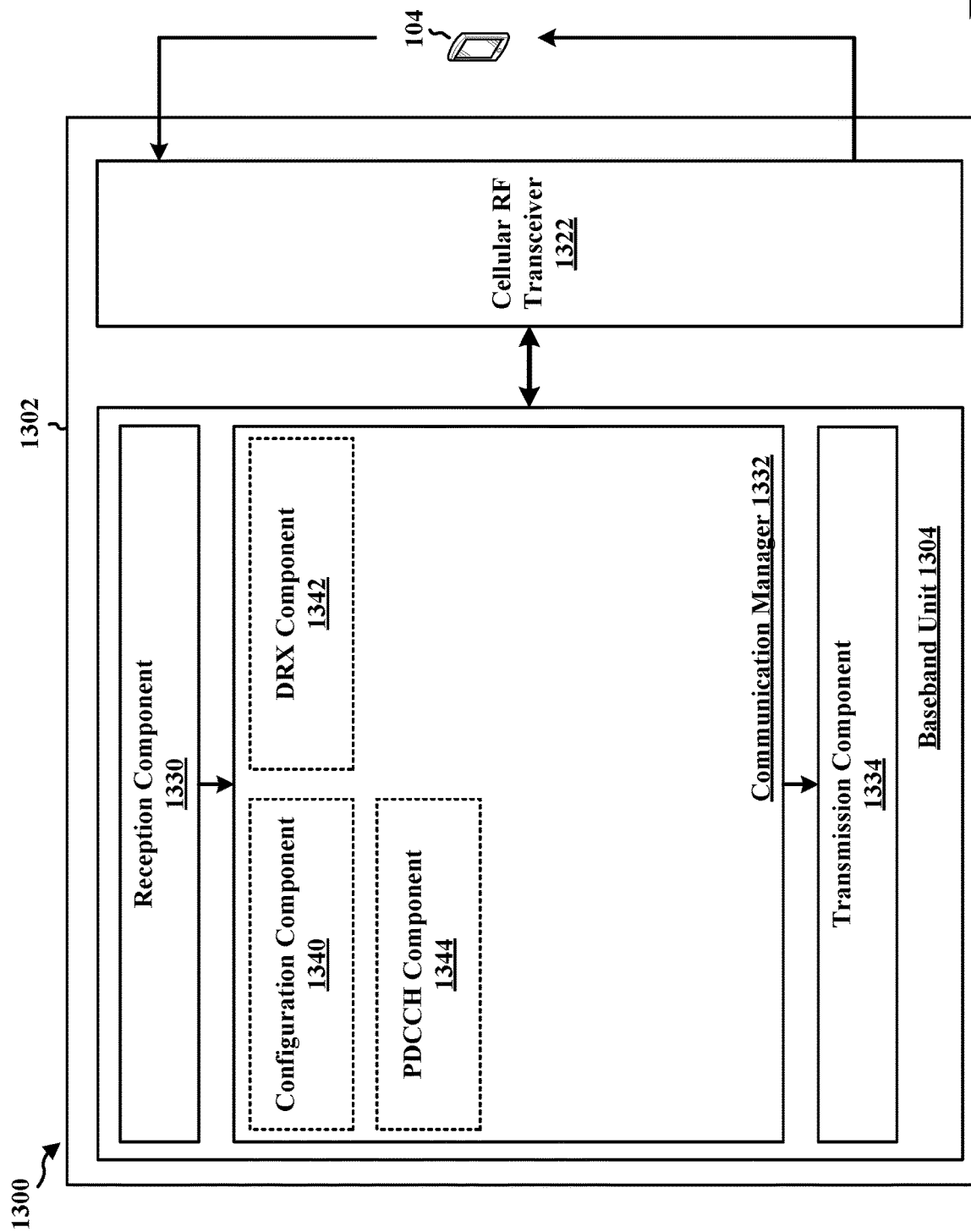
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a configuration component 1340 that may configure a DRX configuration e.g., as described in connection with 1102 of FIG. 11 or 1202 of FIG. 12. The communication manager 1332 further includes a DRX component 1342 that may transmit the DRX configuration, e.g., as described in connection with 1204 of FIG. 12. The communication manager 1332 further includes a PDCCH component 1344 that may transmit a PDCCH based on the DRX configuration, e.g., as described in connection with 1104 of FIG. 11 or 1206 of FIG. 12.

The apparatus may include additional components that perform each of the blocks of the algorithm in the flowcharts of FIG. 11 or 12. As such, each block in the flowcharts of FIG. 11 or 12 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for configuring a DRX configuration having an inactivity timer. The apparatus includes means for transmitting, to a UE, a PDCCH based on the DRX configuration. The UE determines whether the PDCCH corresponds to a linked PDCCH candidate and a new transmission is scheduled. The linked PDCCH candidate is comprised of two or more PDCCH repetitions. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to monitor for a PDCCH based on a DRX configuration, the DRX configuration having an inactivity timer; determine whether the PDCCH corresponds to a linked PDCCH candidate and a new transmission is scheduled, wherein the linked PDCCH candidate is comprised of two or more PDCCH repetitions; and start the inactivity timer in a first symbol after an end of at least one of the two or more PDCCH repetitions.

Aspect 2 is the apparatus of aspect 1, further includes a transceiver coupled to the at least one processor.

Aspect 3 is the apparatus of any of aspects 1 and 2, further includes that the inactivity timer is started in the first symbol after the end of a first PDCCH repetition.

Aspect 4 is the apparatus of any of aspects 1-3, further includes that the inactivity timer is started in the first symbol after the end of a last PDCCH repetition.

Aspect 5 is the apparatus of any of aspects 1-4, further includes that the at least one processor is further configured to receive, from a base station, the DRX configuration via RRC signaling.

Aspect 6 is the apparatus of any of aspects 1-5, further includes that determining whether the PDCCH corresponds to the linked PDCCH candidate comprises at least one of two or more linked PDCCH candidates are always received together, a bit in DCI indicating that the DCI corresponds to the linked PDCCH candidate, a different RNTI is used for scrambling of the DCI when the DCI corresponds to the linked PDCCH candidate, or a different scrambling identifier is used for PDCCH scrambling or for DMRS scrambling.

Aspect 7 is the apparatus of any of aspects 1-6, further includes that at least a first repetition is within an active time and at least a second repetition is outside of the active time.

Aspect 8 is the apparatus of any of aspects 1-7, further includes that all repetitions of the linked PDCCH candidate are monitored.

Aspect 9 is the apparatus of any of aspects 1-8, further includes that repetitions within the active time are monitored.

Aspect 10 is the apparatus of any of aspects 1-9, further includes that repetitions of the linked PDCCH candidate are not monitored.

Aspect 11 is a method of wireless communication for implementing any of aspects 1-10.

Aspect 12 is an apparatus for wireless communication including means for implementing any of aspects 1-10.

Aspect 13 is a computer-readable medium storing computer executable code, where the code when executed by a processor causes the processor to implement any of aspects 1-10.

Aspect 14 is an apparatus for wireless communication at a base station including at least one processor coupled to a memory and configured to configure a DRX configuration having an inactivity timer; and transmit, to a UE, a PDCCH based on the DRX configuration, wherein the UE determines whether the PDCCH corresponds to a linked PDCCH candidate and a new transmission is scheduled, wherein the linked PDCCH candidate is comprised of two or more PDCCH repetitions.

Aspect 15 is the apparatus of aspect 14, further includes a transceiver coupled to the at least one processor.

Aspect 16 is the apparatus of any of aspects 14 and 15, further includes that the inactivity timer is started in a first symbol after an end of a first PDCCH repetition.

Aspect 17 is the apparatus of any of aspects 14-16, further includes that the inactivity timer is started in a first symbol after an end of a last PDCCH repetition.

Aspect 18 is the apparatus of any of aspects 14-17, further includes that the DRX configuration is transmitted via RRC signaling.

Aspect 19 is the apparatus of any of aspects 14-18, further includes that the PDCCH corresponds to the linked PDCCH candidate based on at least one of two or more linked PDCCH candidates are always received together, a bit in DCI indicating that the DCI corresponds to the linked PDCCH candidate, a different RNTI is used for scrambling of the DCI when the DCI corresponds to the linked PDCCH candidate, or a different scrambling identifier is used for PDCCH scrambling or for DMRS scrambling.

Aspect 20 is the apparatus of any of aspects 14-19, further includes that at least a first repetition is within an active time and at least a second repetition is outside of the active time.

Aspect 21 is the apparatus of any of aspects 14-20, further includes that all repetitions of the linked PDCCH candidate are monitored.

Aspect 22 is the apparatus of any of aspects 14-21, further includes that repetitions within the active time are monitored.

Aspect 23 is the apparatus of any of aspects 14-22, further includes that repetitions of the linked PDCCH candidate are not monitored.

Aspect 24 is a method of wireless communication for implementing any of aspects 14-23.

Aspect 25 is an apparatus for wireless communication including means for implementing any of aspects 14-23.

Aspect 26 is a computer-readable medium storing computer executable code, where the code when executed by a processor causes the processor to implement any of aspects 14-23.

What is claimed is:

1. An apparatus for wireless communication at a user equipment (UE), comprising:
a memory; and
at least one processor coupled to the memory and configured to:
monitor for a physical downlink control channel (PDCCH) based on a discontinuous reception (DRX) configuration, the DRX configuration having an inactivity timer;
determine whether the PDCCH corresponds to a linked PDCCH candidate and a new transmission is scheduled, wherein the linked PDCCH candidate is comprised of two or more PDCCH repetitions; and
in response to the PDCCH corresponding to the linked PDCCH candidate and the new transmission being scheduled, start the inactivity timer in a first symbol after an end of at least one of the two or more PDCCH repetitions.

2. The apparatus of claim 1, further comprising a transceiver coupled to the at least one processor.

3. The apparatus of claim 1, wherein the inactivity timer is started in the first symbol after the end of a first PDCCH repetition.

4. The apparatus of claim 1, wherein the inactivity timer is started in the first symbol after the end of a last PDCCH repetition.

5. The apparatus of claim 1, wherein the at least one processor is further configured to:
receive, from a base station, the DRX configuration via radio resource control (RRC) signaling.

6. The apparatus of claim 1, wherein determining whether the PDCCH corresponds to the linked PDCCH candidate comprises at least one of:
two or more linked PDCCH candidates are always received together,
a bit in downlink control information (DCI) indicating that the DCI corresponds to the linked PDCCH candidate,
a different radio network temporary identifier (RNTI) is used for scrambling of the DCI when the DCI corresponds to the linked PDCCH candidate, or
a different scrambling identifier is used for PDCCH scrambling or for demodulated reference signal (DMRS) scrambling.

7. The apparatus of claim 1, wherein at least a first repetition is within an active time and at least a second repetition is outside of the active time.

8. The apparatus of claim 7, wherein all repetitions of the linked PDCCH candidate are monitored.

9. The apparatus of claim 7, wherein repetitions within the active time are monitored.

10. The apparatus of claim 7, wherein repetitions of the linked PDCCH candidate are not monitored.

11. A method of wireless communication at a user equipment (UE), comprising:
monitoring for a physical downlink control channel (PDCCH) based on a discontinuous reception (DRX) configuration, the DRX configuration having an inactivity timer;
determining whether the PDCCH corresponds to a linked PDCCH candidate and a new transmission is scheduled, wherein the linked PDCCH candidate is comprised of two or more PDCCH repetitions; and
in response to the PDCCH corresponding to the linked PDCCH candidate and the new transmission being scheduled, starting the inactivity timer in a first symbol after an end of at least one of the two or more PDCCH repetitions.

12. The method of claim 11, wherein the inactivity timer is started in the first symbol after the end of a first PDCCH repetition.

13. The method of claim 11, wherein the inactivity timer is started in the first symbol after the end of a last PDCCH repetition.

14. The method of claim 11, further comprising:
receiving, from a base station, the DRX configuration via radio resource control (RRC) signaling.

15. The method of claim 11, wherein the determining whether the PDCCH corresponds to the linked PDCCH candidate comprises at least one of:
two or more linked PDCCH candidates are always received together,
a bit in downlink control information (DCI) indicating that the DCI corresponds to the linked PDCCH candidate, a different radio network temporary identifier (RNTI) is used for scrambling of the DCI when the DCI corresponds to the linked PDCCH candidate, or a different scrambling identifier is used for PDCCH scrambling or for demodulated reference signal (DMRS) scrambling.

16. An apparatus for wireless communication at a base station, comprising:

a memory; and at least one processor coupled to the memory and configured to:

configure a discontinuous reception (DRX) configuration having an inactivity timer; and transmit, to a user equipment (UE), a physical downlink control channel (PDCCH) based on the DRX configuration, wherein the UE determines whether the PDCCH corresponds to a linked PDCCH candidate and a new transmission is scheduled and in response to the PDCCH corresponding to the linked PDCCH candidate and the new transmission being scheduled, starts the inactivity timer in a first symbol after an end of at least one of the two or more PDCCH repetitions, wherein the linked PDCCH candidate is comprised of two or more PDCCH repetitions.

17. The apparatus of claim 16, further comprising a transceiver coupled to the at least one processor.

18. The apparatus of claim 16, wherein the inactivity timer is started in a first symbol after an end of a first PDCCH repetition.

19. The apparatus of claim 16, wherein the inactivity timer is started in a first symbol after an end of a last PDCCH repetition.

20. The apparatus of claim 16, wherein the DRX configuration is transmitted via radio resource control (RRC) signaling.

21. The apparatus of claim 16, wherein the PDCCH corresponds to the linked PDCCH candidate based on at least one of:

two or more linked PDCCH candidates are always received together, a bit in downlink control information (DCI) indicating that the DCI corresponds to the linked PDCCH candidate, a different radio network temporary identifier (RNTI) is used for scrambling of the DCI when the DCI corresponds to the linked PDCCH candidate, or a different scrambling identifier is used for PDCCH scrambling or for demodulated reference signal (DMRS) scrambling.

22. The apparatus of claim 16, wherein at least a first repetition is within an active time and at least a second repetition is outside of the active time.

23. The apparatus of claim 22, wherein all repetitions of the linked PDCCH candidate are monitored.

24. The apparatus of claim 22, wherein repetitions within the active time are monitored.

25. The apparatus of claim 22, wherein repetitions of the linked PDCCH candidate are not monitored.

26. A method of wireless communication at a base station, comprising:

configuring a discontinuous reception (DRX) configuration having an inactivity timer; and transmitting, to a user equipment (UE), a physical downlink control channel (PDCCH) based on the DRX configuration, wherein the UE determines whether the PDCCH corresponds to a linked PDCCH candidate and a new transmission is scheduled and in response to the PDCCH corresponding to the linked PDCCH candidate and the new transmission being scheduled, starts the inactivity timer in a first symbol after an end of at least one of the two or more PDCCH repetitions, wherein the linked PDCCH candidate is comprised of two or more PDCCH repetitions.

27. The method of claim 26, wherein the inactivity timer is started in a first symbol after an end of a first PDCCH repetition.

28. The method of claim 26, wherein the inactivity timer is started in a first symbol after an end of a last PDCCH repetition.

29. The method of claim 26, wherein the DRX configuration is transmitted via radio resource control (RRC) signaling.

30. The method of claim 26, wherein the PDCCH corresponds to the linked PDCCH candidate based on at least one of:

two or more linked PDCCH candidates are always received together, a bit in downlink control information (DCI) indicating that the DCI corresponds to the linked PDCCH candidate, a different radio network temporary identifier (RNTI) is used for scrambling of the DCI when the DCI corresponds to the linked PDCCH candidate, or a different scrambling identifier is used for PDCCH scrambling or for demodulated reference signal (DMRS) scrambling.

* * * * *